United States Patent
Dépault

(10) Patent No.: US 7,497,388 B2
(45) Date of Patent: Mar. 3, 2009

(54) DISTRIBUTOR FOR LIQUID MANURE AND THE LIKE

(76) Inventor: Marcel Dépault, 1875, rang St-Edouard, St-Simon-de-Bagot, Québec (CA) J0H 1Y0

(*) Notice: Subject to any disclaimer, the term of this patent is extended or adjusted under 35 U.S.C. 154(b) by 649 days.

(21) Appl. No.: 11/056,264

(22) Filed: Feb. 14, 2005

(65) Prior Publication Data

US 2005/0242213 A1    Nov. 3, 2005

Related U.S. Application Data

(60) Provisional application No. 60/543,909, filed on Feb. 13, 2004.

(30) Foreign Application Priority Data

Nov. 24, 2004  (CA) .................................. 2488457

(51) Int. Cl.
*B05B 1/20* (2006.01)
*B05B 1/16* (2006.01)
*B05B 1/14* (2006.01)
*A01G 25/09* (2006.01)

(52) U.S. Cl. .................. 239/168; 239/166; 239/167; 239/170; 239/172; 239/553.5

(58) Field of Classification Search ............ 239/146, 239/159, 164, 166, 167, 168, 170, 172, 548, 239/553, 553.5, 562, 566, 589, 590, 590.5, 239/662; 137/561 A; 111/119
See application file for complete search history.

(56) References Cited

U.S. PATENT DOCUMENTS

| | | | | |
|---|---|---|---|---|
| 791,425 A * | 5/1905 | Johnson | ...................... | 222/478 |
| 3,736,955 A * | 6/1973 | Schlesser | ................ | 137/561 A |
| 4,014,271 A * | 3/1977 | Rohlf et al. | .................. | 111/123 |
| 4,284,243 A * | 8/1981 | Shaner | ........................ | 239/469 |
| 4,479,444 A * | 10/1984 | Takata | ........................ | 111/118 |
| 5,271,567 A * | 12/1993 | Bauer | ........................ | 239/662 |
| 5,435,493 A * | 7/1995 | Houle | ........................ | 239/662 |

FOREIGN PATENT DOCUMENTS

| | | |
|---|---|---|
| CA | 2121994 | 2/1999 |
| CA | 2201651 | 1/2005 |

* cited by examiner

*Primary Examiner*—Darren W Gorman
(74) *Attorney, Agent, or Firm*—Ogilvy Renault LLP

(57) ABSTRACT

A liquid manure distributor comprises a hollow elongated beam adapted to extend transversally horizontally at a rear bottom end of a spreader. The beam is connected in fluid flow communication with a feed pipe. A plurality of discharged holes are distributed along the hollow elongated beam for distributing the liquid medium from the hollow elongated beam onto the ground surface.

22 Claims, 7 Drawing Sheets

US 7,497,388 B2

DISTRIBUTOR FOR LIQUID MANURE AND THE LIKE

RELATED APPLICATIONS

This application claims benefit of U.S. Provisional Patent Application No. 60/543,909 filed Feb. 13, 2004.

BACKGROUND OF THE INVENTION

1. Field of the Invention

The present invention relates to fertilizer distributors, and more particularly to spreaders suited for spreading liquid manure.

2. Background Art

Liquid manure spreaders generally comprise a distributor receiving manure from a pump in fluid connection with a manure reservoir. The distributor distributes the manure into a plurality of downwardly depending flexible hoses that are supported on a tool bar that can also support agricultural tools.

However, the flexible hoses are easily damaged. In addition, they are susceptible to becoming clogged and can be difficult to unclog because of their length. Plus, there is often a difference between the volume of manure supplied to the different hoses, which leads to an uneven distribution.

Canadian Patent 2,121,994 to Houle discloses a distributor equalizing the volume of manure supplied to the different hoses, and diminishing the risk of clogging thereof. However, the disclosed distributor still uses the flexible hoses with the disadvantages mentioned above. In addition, the cylindrical shape of the distributor considerably limits the diameter and number of the flexible hoses that can be used therewith since they are circumferentially distributed on top of the distributor.

SUMMARY OF INVENTION

It is therefore an aim of the present invention to provide an improved liquid manure distributor.

Therefore, in accordance with the present invention, there is provided a distributor for distributing a liquid medium on a ground surface, the distributor being adapted to be used with a spreader including a vehicle carrying a reservoir connected to a pump feeding the liquid medium from the reservoir to a conduit, the distributor comprising a hollow elongated body adapted to extend transversally horizontally at the rear of the spreader, the hollow elongated body having closed ends and defining an enclosure, an inlet in the hollow elongated body adapted to be connected in fluid flow communication with the conduit, and a plurality of pipes, each pipe having a generally inverted "U" shape, each pipe having a first end connected to a top surface of the hollow elongated body such as to be in fluid communication with the enclosure, and a second end extending downwardly such as to be in proximity to the ground surface, wherein the liquid medium pumped into the enclosure by the pump through the conduit fills the enclosure through the inlet and overflows in the pipes such as to be distributed on the ground surface through the second ends of the pipes.

In accordance with a further general aspect of the present invention, there is provided a distributor for distributing a liquid medium on a ground surface, the distributor being adapted to be used with a spreader including a frame adapted to ride on the ground and carrying a reservoir connected to a pump feeding the liquid medium from the reservoir to a feed pipe, the distributor comprising: a hollow elongated beam adapted to extend transversally horizontally at a rear bottom end of the spreader, the hollow elongated beam defining an enclosure;

an inlet in the hollow elongated beam adapted to be connected in fluid flow communication with the feed pipe; and a plurality of discharged hole distributed along said hollow elongated beam for distributing the liquid medium from the hollow elongated beam onto the ground surface.

In accordance with a still further general aspect of the present invention, there is provided a distributor for use in a spreader to apply a liquid medium over farm fields, the distributor comprising a distribution chamber having an inlet for receiving a flow of liquid manure and a plurality of outlets arranged about said inlet, and a plurality of baffles extending into said distribution chamber between adjacent outlets, said outlets being separated from one another by said baffles which split the incoming flow of liquid manure at its entry into the distribution chamber between said outlets.

In accordance with a still further general aspect of the present invention, there is provided a distributor for use in a liquid manure spreader to apply manure at ground level over a field, the distributor comprising a distribution chamber having an inlet adapted to receive an incoming flow of liquid manure, a plurality of baffles provided in said distribution chamber and splitting the incoming flow of liquid manure between individual conduits leading to separate outlets arranged in a series transversal to a direction of travel of the spreader and in closed spaced relationship to the ground.

BRIEF DESCRIPTION OF THE DRAWINGS

Reference will now be made to the accompanying drawings, showing by way of illustration a preferred embodiment thereof and in which.

DESCRIPTION OF THE PREFERRED EMBODIMENTS

Figure 1:
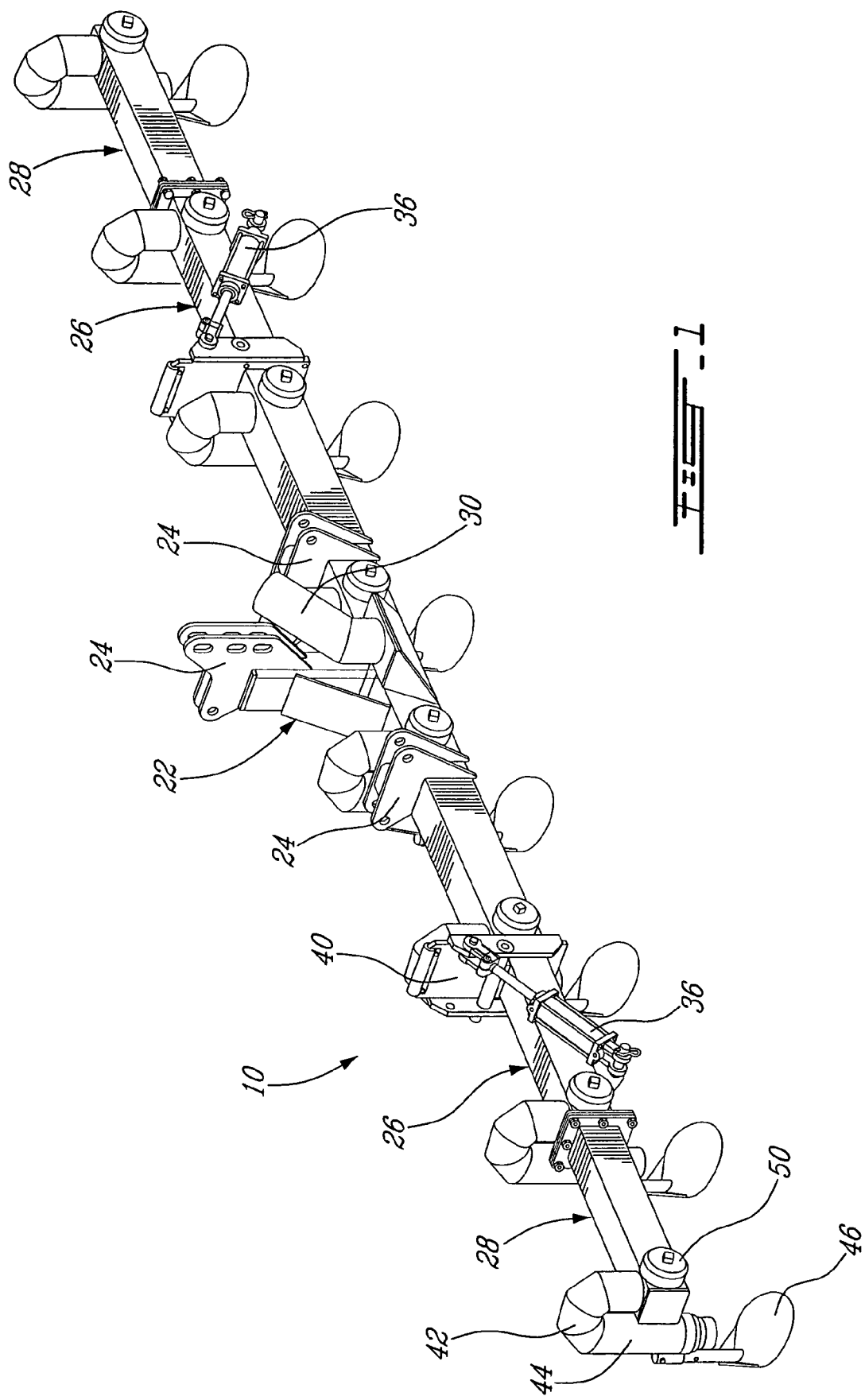
FIG. 1 is a perspective view of a liquid manure distributor according to a preferred embodiment of the present invention.
Figure 2:
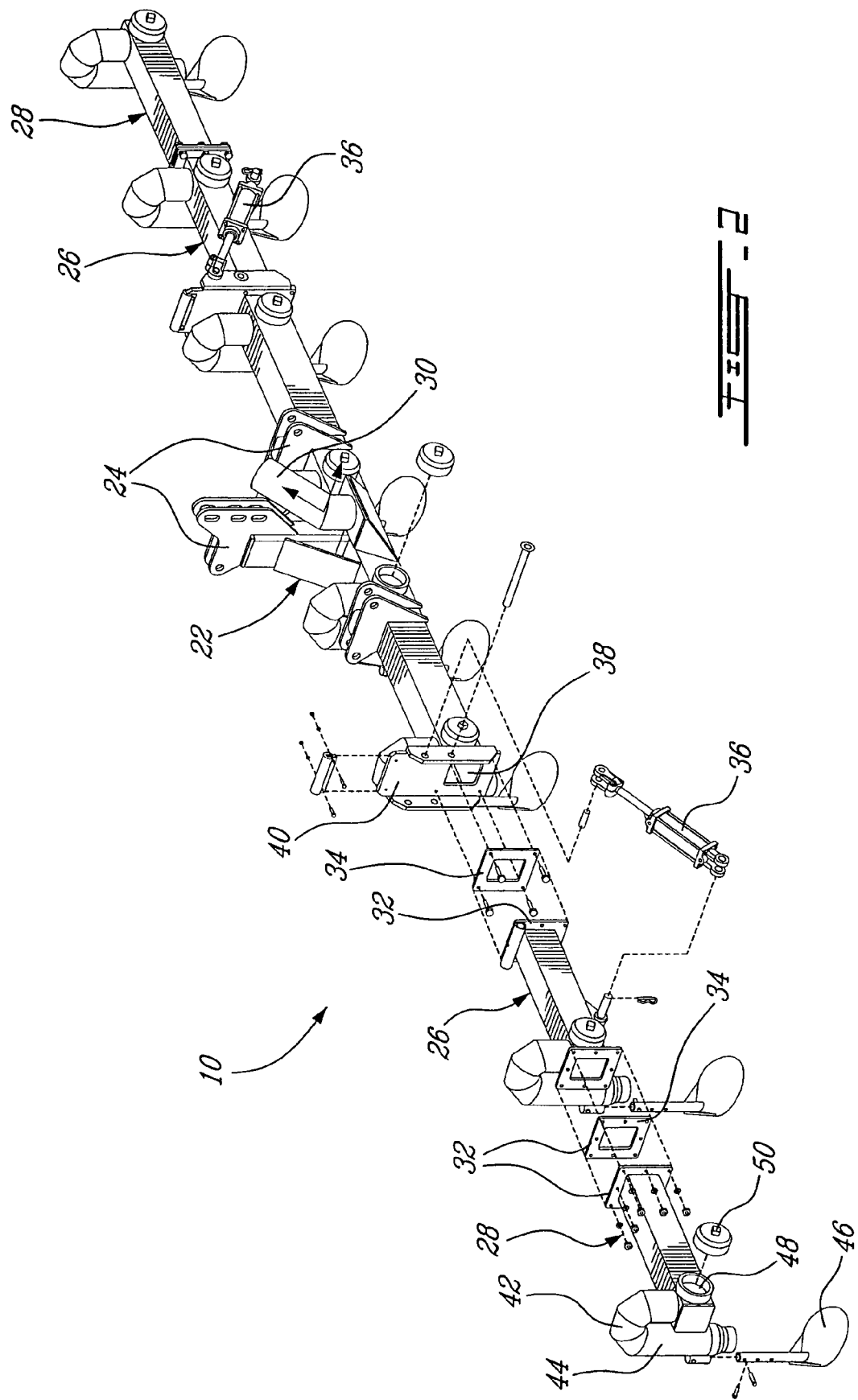
FIG. 2 is a perspective exploded view of the distributor of FIG. 1.
Figure 3:
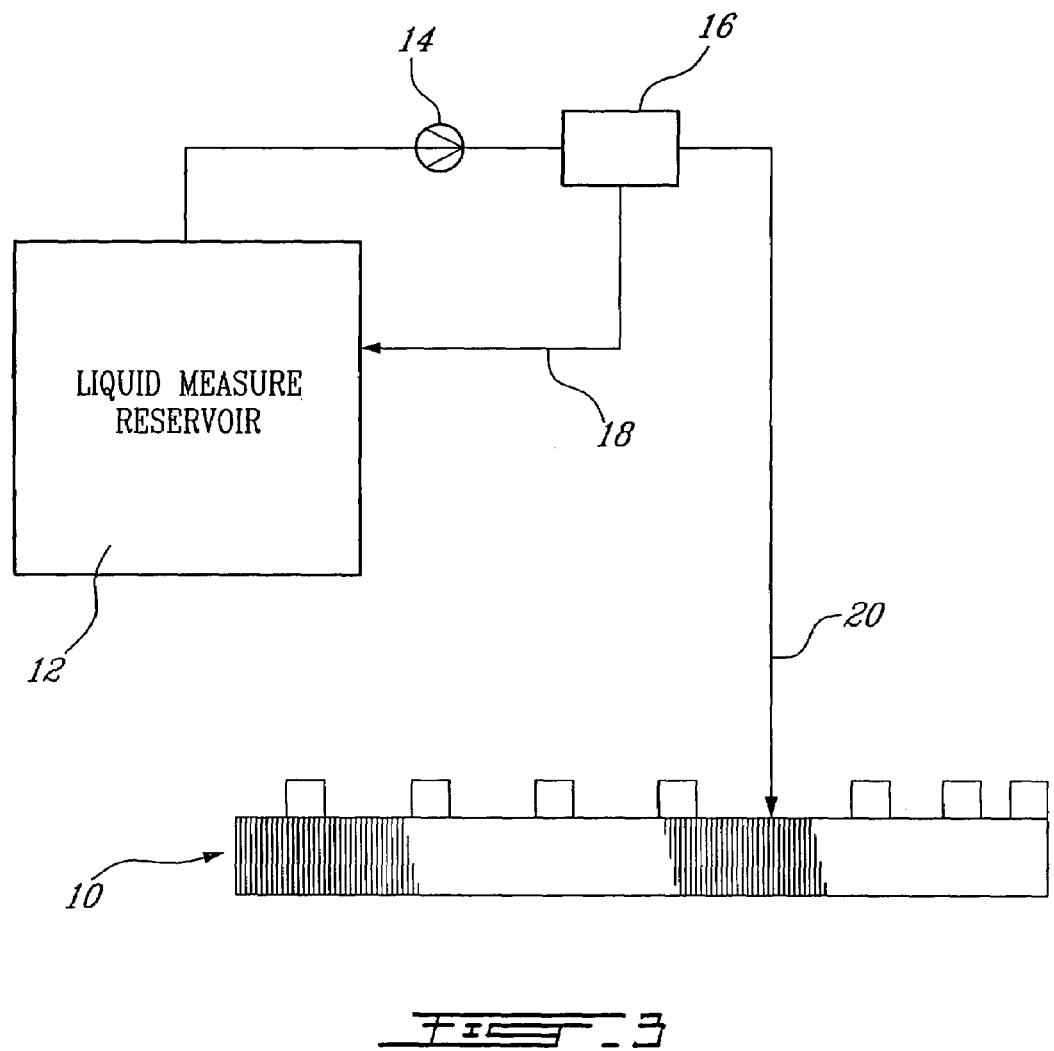
FIG. 3 is a schematic diagram of a flow control system of the distributor of FIG. 1.

Referring to FIGS. 1-2, a liquid manure distributor according to an embodiment of the present invention takes the form of a transverse hollow flow beam which is generally indicated at 10. As shown in FIG. 3, the beam 10 is adapted to be used with a liquid manure spreader comprising a motive vehicle (not shown) carrying a reservoir 12 containing liquid manure, and a pump 14 having an inlet in fluid communication with the reservoir 12 and an outlet connected to a guillotine-type valve 16. The valve 16 can be readily adjusted to split the flow of liquid manure in a desired ratio between a return line 18 connected to the reservoir 12 and an inlet line 20 connected to the hollow beam 10.

Referring to FIGS. 1-2, the beam 10 is preferably multi-sectional. A hollow elongated tubular central section 22 extends horizontally and perpendicularly to the direction of travel of the spreader. A plurality of vertical plates 24 are provided on the central section 22 for attachment of the beam 10 to the rear of the liquid manure spreader at a distance relatively close to the ground. The plates 24 also provide for the mounting of other equipment to the rear of the liquid manure spreader. The central section 22 is open at both ends.

A hollow elongated tubular intermediary section 26 is connected at each of the two ends of the central section 22 such as to be aligned therewith. The two intermediary sections 26 also each have two open ends. A hollow elongated tubular outer section 28 is connected at the outer end of each of the intermediary sections 26 such as to be aligned therewith. The two outer sections 28 each have one open end adjacent to the corresponding intermediary section 26 and one closed end.

The central, intermediary and outer sections 22, 26, 28 have the same cross-section and are in fluid communication with each other. The open ends of adjacent sections are aligned such that the aligned sections 22, 26, 28 together define a fluid tight enclosure. A conduit 30, forming part of the inlet line 20, is connected to the central section 22 and defines an inlet for that enclosure. The conduit 30 is adapted to be connected to the pump 14 via valve 16.

The adjacent outer and intermediary sections 26, 28 are rigidly connected to each other, preferably by bolting together a pair of flanges 32, one flange being integral with each section and surrounding the open end thereof. A seal 34 is preferably sandwiched between the flanges 32 such as to prevent leaks.

The intermediary sections 26 are each connected to the central section 22 through an actuator 36. In a preferred embodiment, the contact between the central section 22 and each intermediary section 26 is made between a flange 32 integral with the intermediary section 26 and surrounding the open end thereof, and a seal 34 attached around an opening 38 in an end plate 40 integral with the central section 22. Retraction of the actuator 36 allows the integral intermediary and outer sections 26, 28 to be lifted, thus reducing the effective width of the beam 10. Preferably, the plate 40 is U-shaped to snuggly receive the body of the lifted intermediary section 26. Thus, the body of the lifted intermediary section 26 acts as a plug on the opening 38 of the central section 22 such as to form a central fluid tight enclosure therewithin.

At least one inverted U-shaped pipe 42 is connected by one end to the top of each of the sections 22, 26, 28 such as to be in fluid communication with the enclosure. In a preferred embodiment, four (4) inverted U-shaped pipes 42 are provided on the central section 22 and one is provided on each of the other sections 26, 28, for a total of eight (8) inverted U-shaped pipes 42. The other end of each inverted U-shaped pipe 42 extends downwardly behind the beam 10 and is preferably connected to a straight pipe 44 such as to deliver the manure closer to the ground. The distance between adjacent pipes 42 generally corresponds to that of adjacent furrows or planting rows in the field to be fertilized.

A dispersion plate 46 is detachably connected under each straight pipe 44 such as to disperse the liquid manure in a relatively uniform film. The dispersion plates 46 can be removed when it is desired to spread the liquid manure in discrete rows rather than in a somewhat continuous film.

At least one access opening 48 is provided in the front of each section 22, 26, 28. One access opening 48 is preferably aligned with each of the inverted U-shaped pipes 42 such as to facilitate maintenance and unclogging of the pipes 42 if required. Each access opening 48 is closed by a corresponding plug 50.

In use, the pump 14 feeds liquid manure from the reservoir 12 to the pump outlet. The guillotine-type valve 16 allows a selected portion of the manure to return to the reservoir 12, thereby controlling the flow of manure in the beam 10. The liquid manure flows downwardly from the inlet line 20 into the hollow beam 10 through inlet conduit 30. The enclosure formed by the aligned sections 22, 26, 28 of the beam 10 or by the central section 22 alone when the other sections are lifted by the actuators 36, is progressively filled with liquid manure. When the enclosure is full, the liquid manure overflows into the inverted U-shaped pipes 42, through which it is delivered to the ground.

The elongated horizontal enclosure allows the flow of liquid manure to spread out and become less turbulent before entering the inverted U-shaped pipes 42, equalizing the quantity of manure entering each pipe and thus improving the evenness of the distribution. The flexible hoses of the prior art are eliminated. In addition, the elongated shape of the beam 10 provides a large surface for connecting the inverted U-shape pipes 42. A large number of pipes can thus be used if required, as well as pipes having a larger cross-section which could be, for example, oval shaped.

Figure 4:
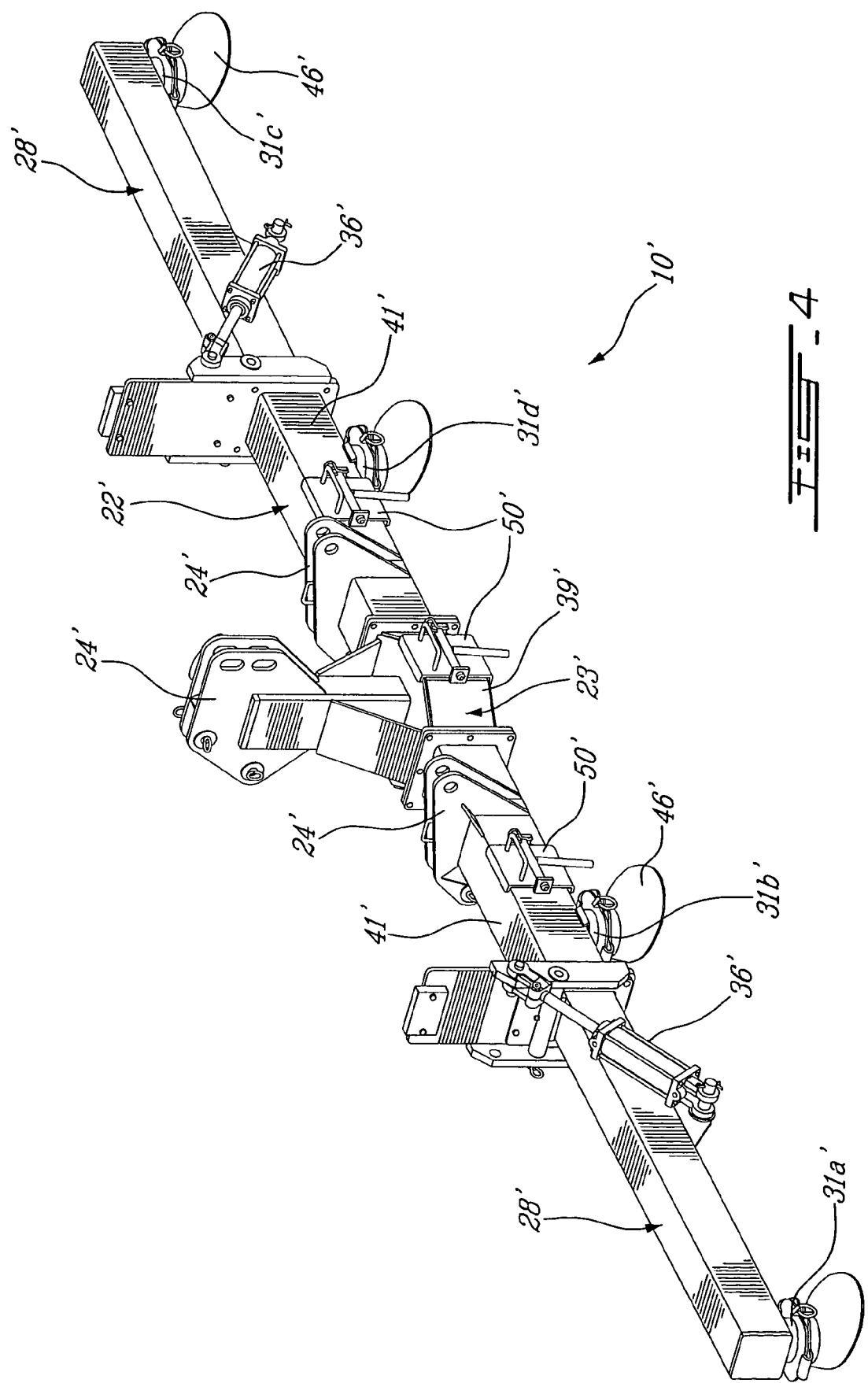
FIG. 4 is a perspective view of a liquid manure distributor according another embodiment of the present invention.
Figure 5:
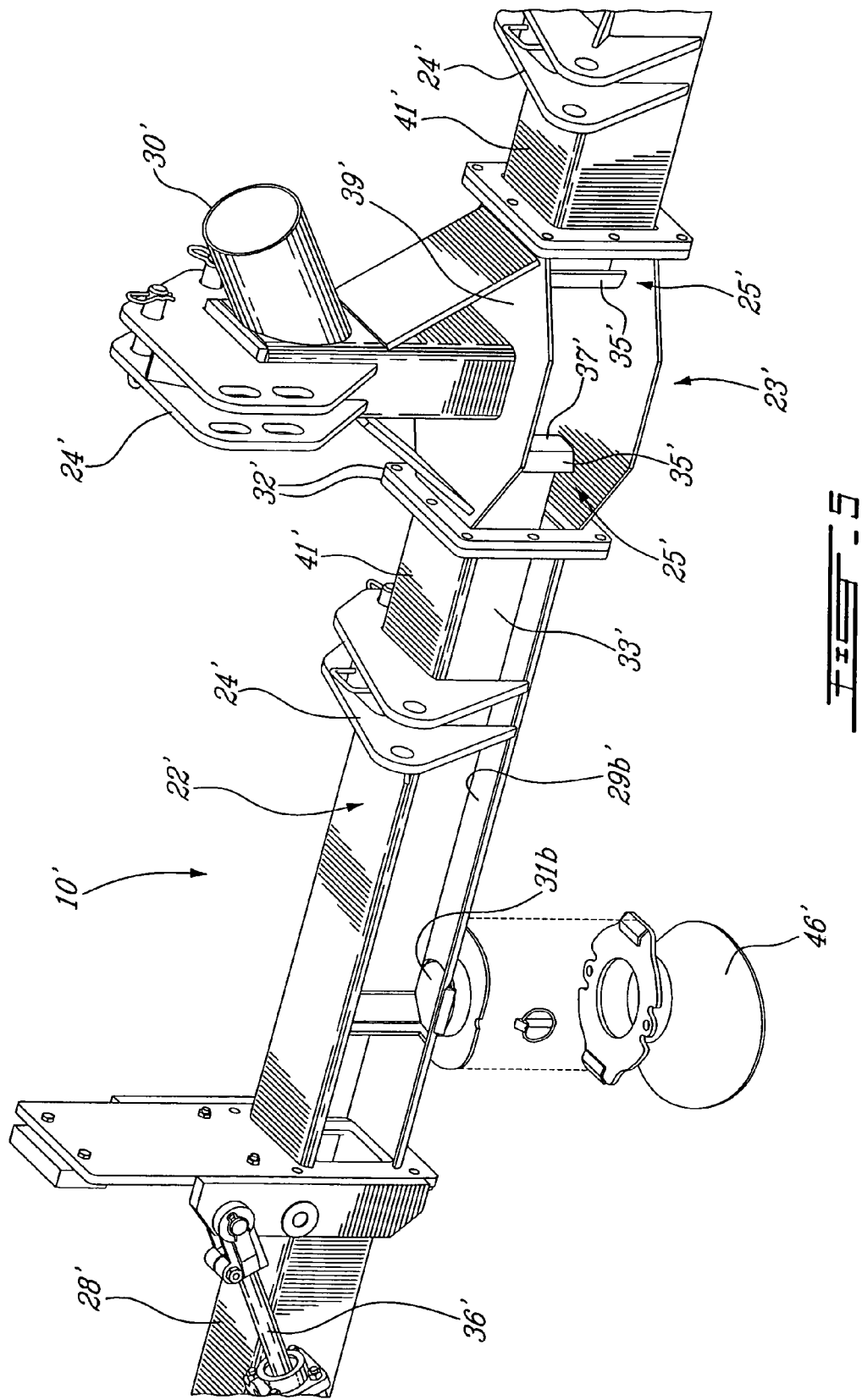
FIG. 5 is an enlarged perspective view of the liquid manure distributor shown in FIG. 4, the front wall of the distributor being removed to reveal the internal details of the distributor.
Figure 6:
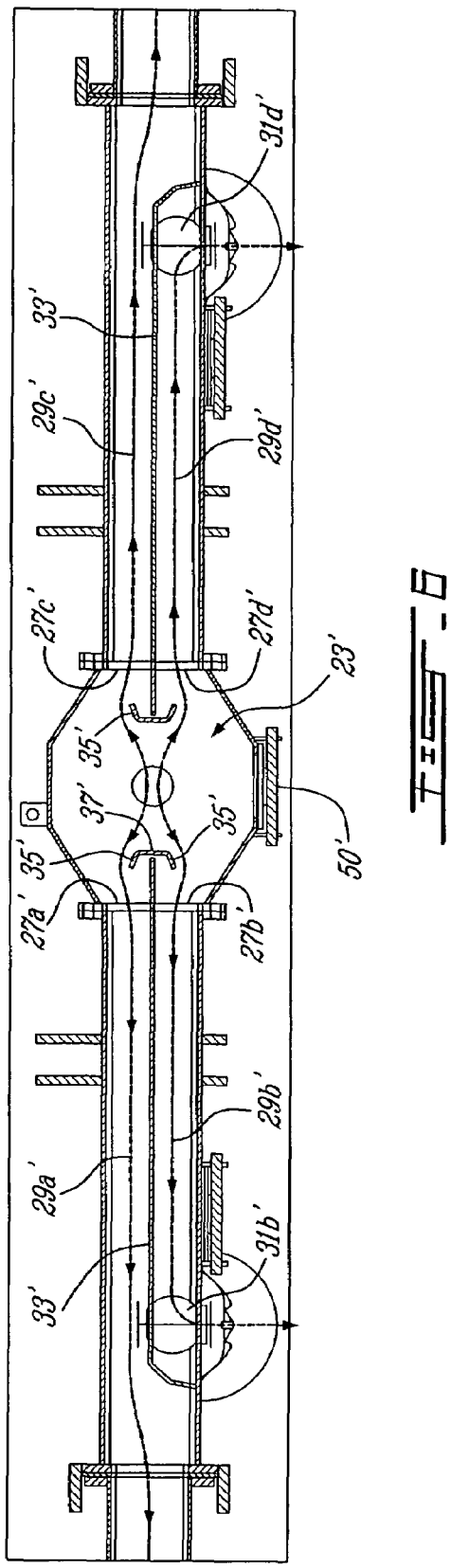
FIG. 6 is an enlarged top cross-sectional view of the liquid manure distributor shown in FIG. 5.

FIGS. 4 to 6 show a second embodiment of the present invention, wherein like parts are designated by like reference numerals. The second embodiment 10' essentially differs from the first embodiment 10 in that a distribution chamber 23' is integrated into the central section 22' of the beam to split the incoming liquid manure at its entry into the beam 10' via inlet 30'.

As shown in FIGS. 5 and 6, the distribution chamber 23' has a plurality of outlets 27a', 27b', 27c' and 27d' (four in the illustrated example) separated from one another by a plurality of baffles 25'(two in the illustrated example) extending axially inwardly into the distribution chamber 23' from opposed ends thereof. The baffles 25' equally split the incoming flow of liquid manure between the outlets 27a', 27b', 27c', 27d'.

The outlets 27a', 27b', 27c' and 27d' are connected in fluid flow communication with respective fluid passages 29a', 29b', 29c' and 29d'. extending axially of the beam 10' away from opposed ends of the distribution chamber 23' and leading to respective discharged holes 31a', 31b', 31c' and 31d', which are defined in the bottom wall of the beam 10' at different distances from the center thereof. The fluid passages 29a', 29b' and 29c', 29d' on each side of the distribution chamber 23' are separated from one another by a central partition 33' extending axially between the top and bottom walls of the beam 10'. As shown in FIG. 6, the outer end of the partitions 33' is bent against the inner surface of the front wall of the beam 10' to close the axial end of passages 29b' and 29d' immediately downstream of the discharged holes 31b' and 31d' thereof. An adaptor (not shown) could be removably mounted to selected one of the discharges holes to further divide the flow of liquid manure. The adaptor would have one inlet connected to the discharged hole an at least two outlets distributed over the length thereof. The adaptor would extend in parallel to the beam 10'. The adaptor would allow the user to have additional discharged point along the beam 10'.

By so dividing the liquid manure at its entry in the distribution chamber 23' and separately directing the liquid manure from the distribution chamber 23' to the discharged holes 31a', 31b', 31c' and 31d', the liquid manure can be more evenly applied over the ground and clogging problems are less likely to occur.

Each baffle 25' has a substantially T-shaped configuration including a pair of flaps 35' extending from opposed ends of a web 37' at an angle to the outlets 27a', 27b', 27c' and 27d' for deflecting the incoming liquid manure which has been discharged centrally into the chamber 23' to associated ones of said outlets 27a', 27b', 27c' and 27d'. The flaps 35' are preferably articulated and/or made of a flexible material, such as rubber, so as to be moveable against fluid pressure in order to prevent the liquid manure from flowing back into the distribution chamber 23' from the passages 29a', 29b', 29c' and 29d' when the spreader travels on uneven ground surfaces and the beam 10' is not at level (i.e. incline to the horizontal). Under the fluid pressure, the flaps 35' will pivot to a position substantially parallel to the webs 37' (perpendicular to the flow) to substantially obstruct the passage through the outlets 27a', 27b', 27c' and 27d'.

As shown in FIG. 5, the central beam section 22' preferably comprise a central segment 39' bolted at opposed ends thereof to two beam segments 41'. The partitions 33' are provided within the segments 41' and project beyond the inner ends thereof so as to extend into the distribution chamber 23' in the central segment 39' once the segments 41' have been assembled to the central segment 39'. The baffles 25' are preferably integrated to the inner end of the partitions 33'. Other arrangements are contemplated as well.

In use, the liquid manure is fed into the beam 10' at the rear bottom end of the spreader via inlet 30'. The liquid manure is discharged in the central region of the distribution chamber 23' between the baffles 25'. The baffles 25' split the incoming liquid manure between the passages 29a', 29b', 29c' and 29d' for allowing the liquid manure to be separately directed to the discharged holes 31a', 31b', 31c' and 31d' where it is discharged over the ground as the spreader is displaced over the ground surface to be fertilized.

It is understood that the beam 10' could be divided in more than four fluid passages by means of additional axially extending partitions. Additional baffles would be provided to split the flow of liquid manure between the additional passages.

Also, it is understood that the distribution chamber 23' does not need to be integrated to a hollow elongated beam. The distribution chamber 23' could take various configurations and the outlets thereof could be connected in fluid flow communication to flexible pipes instead of rigid fluid passages extending along a hollow beam, as herein described.

Figure 7:
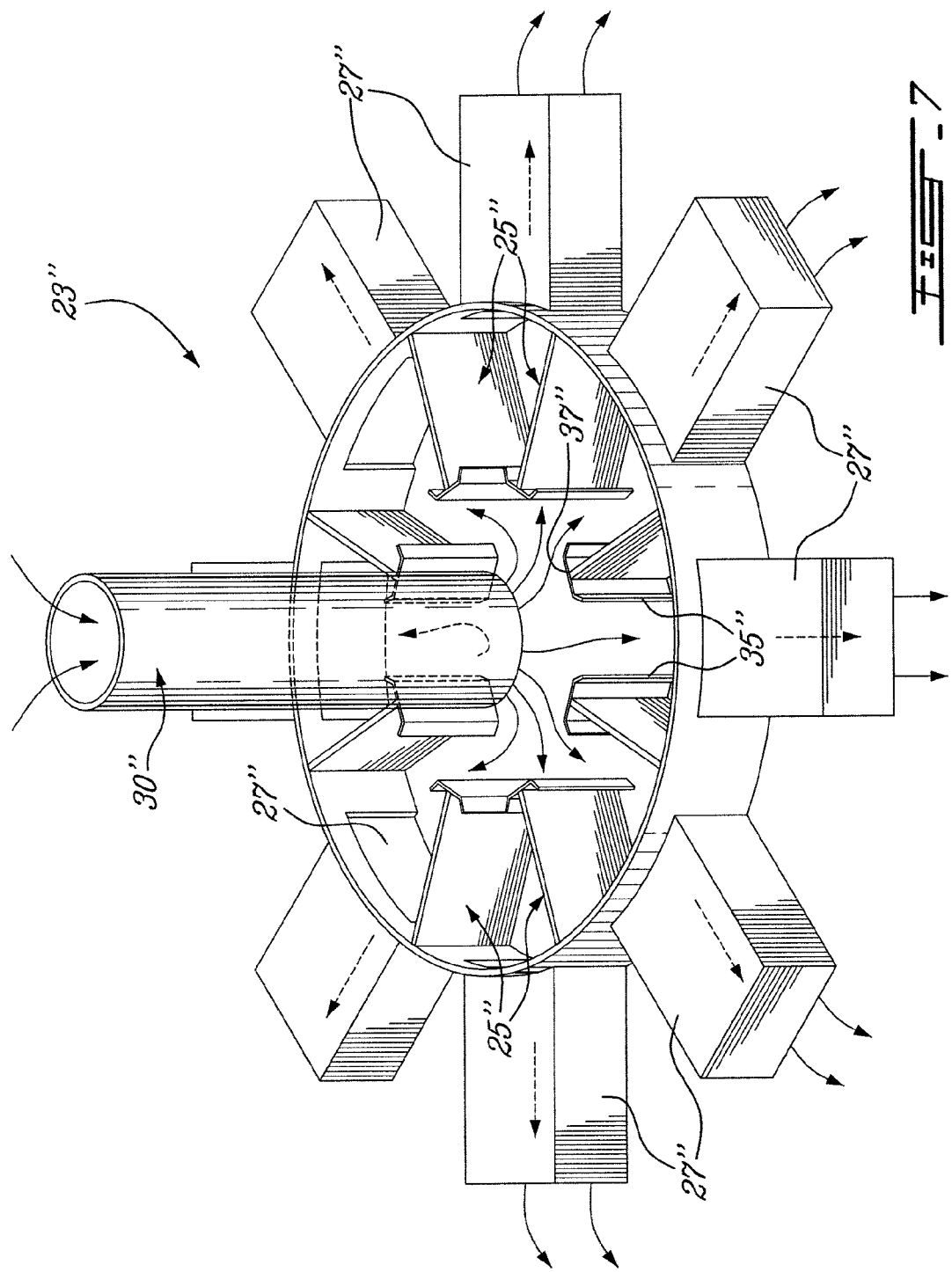
FIG. 7 is schematic perspective view of a distribution chamber in accordance with a further embodiment of the present invention.

For instance, as shown in FIG. 7, the distribution chamber 23" could be provided in the form of a hollow cylindrical enclosure adapted to be mounted at the rear bottom end of a spreader and having a central inlet 30" and a plurality of peripheral outlets 27" distributed about the inlet 30". The inlet 30" could be provided at the bottom or at the top of the distribution chamber 23". Also it is understood that the outlets 27" could be provided elsewhere than in the side wall of the cylindrical enclosure, as shown. For instance, it could be provided in the top wall 23".

The internal volume of the distribution chamber 23" is divided in sectors by a plurality of baffles 25" projecting radially inwardly into the chamber 23" between adjacent outlets 27". The adjacent outlets 27" are separated from one another by the baffles 25". The sectors communicate with a common central area where the incoming fluid manure is discharged before being split by the baffles 25" between the various outlets 27". The outlets 27" are connected in fluid flow communication to respective pipes or conduits (not shown) for discharging the liquid manure at various locations over a farm field. According to this embodiment, the distributor is thus formed by a central distribution chamber and series of pipes extending from the distribution chamber. The configuration and construction of the baffle is generally as described herein be fore with respect to the second embodiment and thus the duplicate description thereof is omitted for brevity.

The embodiments of the invention described above are intended to be exemplary. Those skilled in the art will therefore appreciate that the forgoing description is illustrative only, and that various alternatives and modifications can be devised without departing from the spirit of the present invention. Accordingly, the present is intended to embrace all such alternatives, modifications and variances which fall within the scope of the appended claims.

The invention claimed is:

1. A distributor for distributing a liquid medium on a ground surface, the distributor being adapted to be used with a spreader including a frame adapted to ride on the ground and carrying a reservoir connected to a pump feeding the liquid medium from the reservoir to a feed pipe, the distributor comprising:
   a hollow elongated beam adapted to extend transversally horizontally at a rear bottom end of the spreader, the hollow elongated beam defining an enclosure;
   an inlet in the hollow elongated beam adapted to be connected in fluid flow communication with the feed pipe; and
   a plurality of discharged holes distributed along said hollow elongated beam for distributing the liquid medium from the hollow elongated beam onto the ground surfaces, and
   wherein said hollow elongated beam defines a central distribution chamber, the liquid medium flowing into said distribution chamber through said inlet, said central distribution chamber having a plurality of outlets in fluid flow communication with distinct fluid passages, each of which leads to a respective one of said discharged holes, wherein said hollow elongated beam has a central section and two lateral sections extending in opposite directions from the central section, and wherein the lateral sections are internally divided in at least two elongated fluid passages, the distribution chamber being provided in said central section.

2. The distributor according to claim 1, wherein a plurality of baffles extend into said central distribution chamber between said outlets, said outlets being separated from one another by said baffles.

3. The distributor according to claim 1, wherein internal partitions divide said chamber in sections, each section leading to a different outlet, the section being in flow communication with a common central chamber area receiving the incoming liquid medium through said inlet.

4. The distributor according to claim 1, wherein at least one longitudinal internal partition extends laterally outwardly from the distribution chamber to cooperate with the walls of the hollow elongated beam to define said fluid passages.

5. The distributor according to claim 2, wherein each of said plurality of baffles comprises a flap extending at an angle to an associated one of said outlets.

6. The distributor according to claim 5, wherein said flap is articulated.

7. The distributor according to claim 5, wherein said flap has a flexible body for movement under fluid pressure.

8. The distributor according to claim 1, wherein said beam includes an intermediate segment and two end segments articulated at opposed ends of said intermediate beam segment, said intermediate segment defining the central distribution chamber and having partitions extending laterally outwardly from said chamber to divide an internal space of said intermediate beam into a plurality of axially extending fluid passages.

9. The distributor according to claim 1, wherein the lateral sections are movable between an aligned and a retracted position, the lateral and central sections being in fluid communication in the aligned position such that the enclosure is defined throughout the lateral and central sections, and the lateral sections being angled to the central section in the retracted position such as to close the fluid communication so that the enclosure is limited within the central section.

10. The distributor according to claim 9, wherein the lateral sections are connected to the central section through an actuator.

11. The distributor according to claim 9, wherein each lateral section is composed of at least two subsections rigidly connected together and in fluid communication with each other.

12. A distributor for use in a spreader to apply a liquid medium over farm fields, the distributor comprising a distribution chamber having an inlet for receiving a flow of liquid manure and a plurality of outlets arranged about said inlet, and a plurality of baffles extending into said distribution chamber between adjacent outlets, said outlets being separated from one another by said baffles which split the incoming flow of liquid manure at its entry into the distribution chamber between said outlets, wherein said distributor has an elongated hollow body adapted to extend transversally of the spreader, said distribution chamber being integrated to a central section of said elongated hollow body, and wherein said elongated hollow body is internally divided laterally outwardly of said distribution chamber in at least two axially extending fluid passages.

13. The distributor according to claim 12, wherein at least one longitudinal internal partition extends laterally outwardly from the distribution chamber to cooperate with the walls of the hollow elongated body to define said fluid passages.

14. The distributor according to claim 12 wherein each of said plurality of baffles comprises a flap extending at an angle to an associated one of said outlets.

15. The distributor according to claim 14, wherein said flap is articulated.

16. The distributor according to claim 14, wherein said flap has a flexible body for movement under fluid pressure.

17. The distributor according to claim 14, wherein said elongated hollow body has two end sections articulated at opposed ends of said central section.

18. A distributor for use in a liquid manure spreader to apply manure at ground level over a field, the distributor comprising a distribution chamber having an inlet adapted to receive an incoming flow of liquid manure, a plurality of baffles provided in said distribution chamber and splitting the incoming flow of liquid manure between individual conduits leading to separate outlets arranged in a series transversal to a direction of travel of the spreader and in closed spaced relationship to the ground, wherein said distributor has an elongated hollow body adapted to extend transversally of the spreader, said distribution chamber being integrated to a central section of said elongated hollow body, and wherein said elongated hollow body is internally divided laterally outwardly of said distribution chamber to provide said individual conduits.

19. The distributor according to claim 18, wherein at least one longitudinal internal partition extends laterally outwardly from the distribution chamber to cooperate with the walls of the hollow elongated body to define said individual conduits.

20. The distributor according to claim 18, wherein each of said plurality of baffles comprises an angularly extending flap.

21. The distributor according to claim 20, wherein said flap is articulated.

22. The distributor according to claim 20, wherein said flap has a flexible body for movement under fluid pressure.

* * * * *